United States Patent [19]

Kiraly et al.

[11] Patent Number: 4,959,633
[45] Date of Patent: Sep. 25, 1990

[54] TEMPERATURE SENDER CONNECTOR COVER AND TERMINAL

[75] Inventors: Patrick S. Kiraly, Youngstown; John R. Metzger, Cortland; Randall K. Smith, Fowler, all of Ohio

[73] Assignee: General Motors Corporation, Detroit, Mich.

[21] Appl. No.: 402,297

[22] Filed: Sep. 5, 1989

[51] Int. Cl.$^5$ ............................................. H01C 7/10
[52] U.S. Cl. ................................................. 338/22 R
[58] Field of Search ...................... 338/22 R, 22 SD; 439/344, 358

[56] References Cited

U.S. PATENT DOCUMENTS

| 4,028,591 | 6/1977 | Kahn et al. | 338/22 R X |
| 4,635,026 | 1/1987 | Takeuchi | 338/22 SD |

Primary Examiner—Bruce A. Reynolds
Assistant Examiner—Marvin M. Lateef
Attorney, Agent, or Firm—F. J. Fodale

[57] ABSTRACT

A temperature sender has a spring biased thermistor located in a temperature probe housing; the housing is adapted to be connected to a female connector cover defining a receptacle for a mating connector; a multiple segment flat element terminal is molded in-situ of the cover and one of the terminal segments is located in the temperature probe housing and has connector means thereon which connect to and align a biasing spring with respect to the thermistor; two of the multiple segments are located in the receptacle with one of them serving the dual function of indexing the mating connector to the female connector cover and defining a probe point for testing electrical continuity between the terminal and thermistor and the second one of the other segments serving to electrically connect the mating connector to the thermistor to complete a sender circuit.

8 Claims, 1 Drawing Sheet

TEMPERATURE SENDER CONNECTOR COVER AND TERMINAL

FIELD OF THE INVENTION

This invention relates to temperature senders and more particularly to temperature senders having a thermistor spring biased in a temperature probe to provide an electrical signal of sensed temperature.

BACKGROUND OF THE INVENTION

Temperature senders are known in which a thermistor is located in an electrically conductive thermal probe and spring biased thereagainst by spring means which complete a sender circuit. In the past, the probe has included a barrel shaped terminal portion with an annular head portion which slide fits in a mating connector on a wiring harness. Such prior temperature senders do not include a separate probe surface for checking continuity of the sensing circuit. Also such prior temperature senders do not have a connector cover cavity which is configured to be sealed by a resilient annular, multi-lipped sealing element carried by the mating connector.

Other electrical connectors are known in which a terminal is molded in-situ of a female connector housing. In such cases the female connector housing can have an integral tab for indexing a mating connector with respect to the female connector housing. Such indexing serves to align a clip terminal on the mating connector with a male terminal portion of the terminal. Furthermore, it is known to provide such female connector housing with a cavity in which a seal can seat to seal between the mating connector and the female connector housing.

STATEMENT OF INVENTION AND ADVANTAGES

A feature of the present invention is to form a sender assembly which has an easily manufactured, multi-purpose, flat element terminal, molded in-situ of a female connector cover connected to a thermal probe of the sender assembly having a temperature sensing thermistor spring biased therein.

Another feature of the present invention is to prevent damage to a male terminal in a female connector cover of a sender assembly by inadvertent insertion of a slightly smaller mating connector therein by the provision of an indexing segment on a multi-segment terminal molded in-situ of the female connector cover.

Still another feature of the present invention is to prevent damage to a male blade of a terminal molded in-situ of a female connector cover during probing for electrical continuity between the terminal and a spring biased thermistor in a thermal probe connected to the female connector cover and to do so by the provision of an integral indexing feature on the terminal which defines a probe surface separate and apart from the male blade portion of the terminal.

Another feature of the present invention is to provide a sender assembly which includes a thermal probe having a female connector cover connected thereto and wherein the female connector cover has an easily manufactured multi-segment flat terminal element molded in-situ thereof performing combined functions of piloting a mating connector into a receptacle defined by the female connector cover; forming a surface for probing for electrical continuity between the terminal and a spring biased thermistor in a thermal probe; and capturing and aligning a biasing spring for the thermistor coaxially of the terminal and the thermistor.

Still another feature of the present invention is to provide such a sender assembly wherein the flat terminal element has a core portion thereof embedded in the female connector cover and a segment extending into the receptacle to index a male blade to engage a clip terminal of the mating connector and wherein the segment has a surface located above the male blade for probing for electrical continuity without contacting the male blade.

Yet another feature of the present invention is to provide an easily manufactured multi-purpose molded in-situ terminal for use in sender assemblies which terminal includes a core portion embedded in the base of a female connector cover; a first rectangular segment having a tip portion thereon adapted to engage the end coil of a compression spring for centering the spring for coaxial alignment with the terminal and a thermistor element biased into electrical engagement with a seat portion of a thermal probe portion of the sender assembly; and second and third rectangular segments extending in the opposite direction from the core portion defining respectively a male blade on the terminal and a combined probe surface and indexing feature.

A further feature of the invention is to provide a temperature sender assembly having a compression spring coiled along its length and having end coils thereon and a multi-purpose terminal on the female connector cover which includes a terminal segment with a spring connector including a tip portion and spaced shoulder surfaces wherein the tip portion has a width less than inside diameter of the compression spring and which extends into one end coil of said compression spring so as to cause the spaced shoulder surfaces to be located in engagement with the one end coil for centering the compression spring coaxially of the thermal probe.

Another feature of the present invention is to provide the multi-purpose terminal of the present invention with a probe surface and index feature formed as a rectangular extension on one end of the flat terminal element, the rectangular extension being located on a longitudinal axis offset with respect to the longitudinal axis of a male blade on the terminal.

Still another feature of the present invention is to provide a temperature sender assembly as set-forth above in which the multi-purpose terminal is an easily manufactured flat element having first, second and third integral rectangular portions respectively forming the connector, indexing and male blade portions thereon.

A further feature is to provide for ease in manufacture of the terminal in the preceding paragraph by locating two of the first, second and third integral rectangular portions in the same plane and locating two others of the first, second and third integral rectangular portions perpendicular to each other.

Yet another feature of the present invention is to provide for such ease of manufacture by forming the two other rectangular portions such that one of them has a base segment thereon twisted 90 degrees with respect to the core of the flat element.

Other advantages of the present invention will be readily appreciated as the same becomes better understood by reference to the following detailed description when considered in connection with the accompanying drawings wherein:

DETAILED DESCRIPTION OF THE PREFERRED EMBODIMENT

Figure 1:
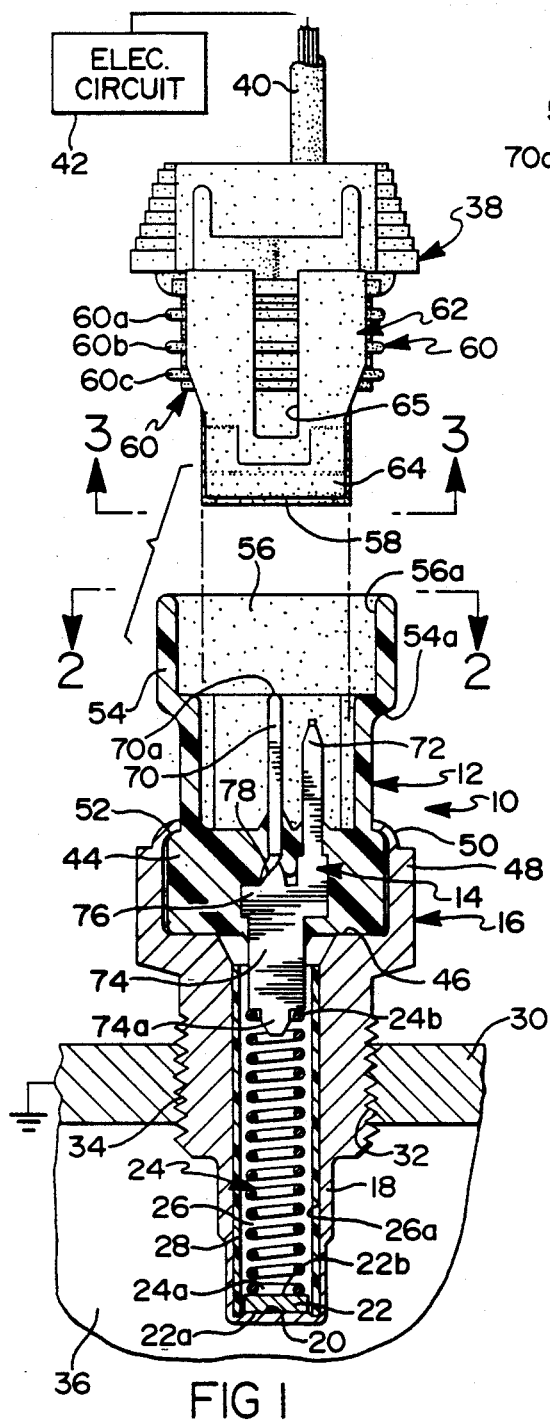
FIG. 1 is an exploded view partially in longitudinal section and partially in elevation of a mating connector and a temperature sender including the present invention.
Figure 2:
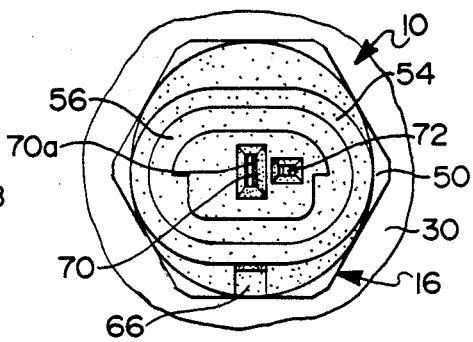
FIG. 2 is a top elevational view looking in the direction of the arrows 2—2 in FIG. 1.
Figure 3:
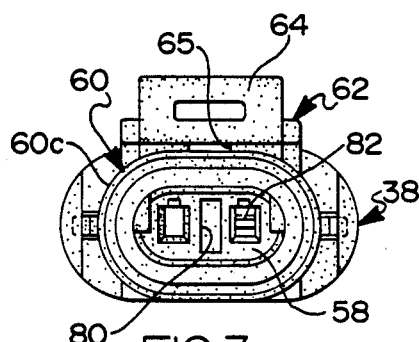
FIG. 3 is a bottom elevational view looking in the direction of the arrows 3—3 in FIG. 1.

FIG. 1 illustrates a temperature sender assembly 10 having a female connector cover 12 and a multi-purpose terminal 14 for performing the function of defining a male blade for connection to a mating connector; the function of defining a surface for probing the terminal without damaging the male blade; and the function of centering a spring for biasing a thermistor against a seat portion of a temperature probe.

The female connector cover 12 is fastened to an electrically conductive shell 16 which has a hollow elongated extension or temperature probe 18 thereon with an interior seat 20 for supporting a temperature sensing thermistor 22.

The thermistor 22 has one surface 22a engaged with the seat 20 and has another surface 22b thereon engaged by the end coil 24a of a compression spring 24. Compression spring 24 is located within a cavity 26 formed in the shell 16 and in the probe 18. The wall 26a of the cavity 26 is circumferential and has an electrical insulation sleeve 28 supported thereon to electrically insulate the compression spring 24 from the shell 16 so that a sender circuit can be completed from a ground point represented by a wall 30 which has a threaded hole 32 therethrough. A threaded exterior 34 of the shell 16 is received in threaded hole 32 so as to locate the probe 18 and thermistor 22 within a space 36 for sensing the temperature of a medium therein. The opposite end coil 24b of the compression spring 24 is in engagement with the multi-purpose terminal 14. A mating connector 38 for the sender assembly 10 has a lead wire 40 adapted to be connected in an electrical circuit 42 which is responsive to changes in the resistance of the thermistor 22 as it senses changes in temperature of the medium in space 36.

Specifically, a sender circuit is completed from mating connector 38, through terminal 14 thence through the compression spring 24 to surface 22b of thermistor 22 to surface 22a thereof. The surface 22a is spring biased by the compression spring 24 into positive electrical contact with the seat 20 for assuring closure of the circuit through the probe 18 and shell 16 to the wall 30 at the threaded interface between hole 32 and the threads on the threaded exterior 34. The insulation sleeve 28 will prevent shorting out the thermistor 22. The thermistor 22 has its resistivity changed with changes in temperature of the medium in space 36. Accordingly the current flow through the sender assembly 10 will vary directly in accordance with the temperature of the medium whose temperature is being sensed.

In accordance with one aspect of the present invention, the female terminal cover 12 of the sender assembly 10 is sealed at opposite ends thereof after it is fastened to the shell 16. More specifically, the base 44 of cover 12 is seated in a cavity 46 in an open end 48 of the shell 16. The base 44 is secured to the end 48 by a lip 50 on the end which is bent into engagement with an exterior surface 52 on the exterior of base 44. The female terminal cover 12 is formed of a high strength plastic material having good electrical insulating properties, e.g. a 45% glass filled polyethylene terepthalate polyester such as Du Pont's Rynite 545. The cover 12 is molded around a core segment of the terminal 14 to seal the terminal 14 with respect to the female connector cover 12. The outer surface of the cover 12 is sealed with respect to the shell 16 by the lip 50.

An open cavity portion 54 of the female terminal cover defines a receptacle 56 on the female connector cover 12 that receives the base 58 of the mating connector 38. The base 58 carries a resilient seal element 60 of elastomeric material with ribs 60a, 60b and 60c that are engageable with the interior surface 56a of the receptacle 56 to seal the interface between the mating connector 38 and the female connector cover 12. Consequently, when the mating connector 38 is seated in the female connector cover 12, the sender assembly 10 is completely sealed end to end. Once seated, the mating connector 38 is locked to the cover 12 by a flex tab 62 which has an outwardly bent end 64 thereon for flexing the tab 62 away from the base 58 as the base 58 is inserted into receptacle 56. The flex tab 62 has a slot 65 which captures a detent 66 on an inboard shoulder 54a of the cavity portion 54 for fastening the mating connector 38 on the female connector cover 12.

Figure 4:
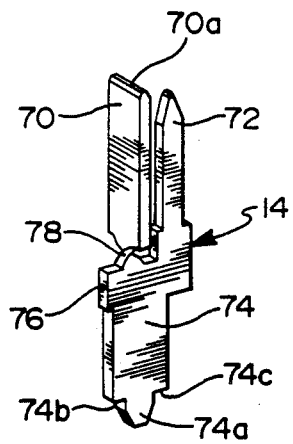
FIG. 4 is a perspective view of a terminal component of the present invention.

A feature of the present invention is the provision of a multi-purpose terminal 14 which is easily manufactured and assembled. The terminal 14 accordingly is formed as a flat element easily formed by high capacity stamping techniques. The terminal 14, as initially stamped, has three rectangular segments 70, 72 and 74 formed integrally of a core segment 76 in the plane thereof. The terminal end 70 is twisted with respect to the plane of the core segment 76 to form a combination probing and indexing function. More particularly, the terminal end 70 has a base 78 thereof twisted 90 degrees to the core segment 76 as shown in FIG. 4. The rectangular segment 70 is thereby located transversely of the receptacle 56 and has a tapered end 70a thereon which will pilot into a blind hole 80 on the mating connector 38. The rectangular segment 72 defines a male blade on the terminal 14 that will be inserted into a clip terminal 82 on the mating connector 38 which is electrically connected to the lead wire 40. The rectangular segment 74 is directed from the core segment 76 in the opposite direction from the rectangular segments 70 and 72 and serves to electrically connect the terminal 14 to the spring 24.

Another feature of the present invention is that the rectangular segment 74 performs a connector and centering function. More particularly, the rectangular segment 74 has a tip portion 74a thereon which has a width slightly less than that of the I.D. of end coil 24b of compression spring 24. Shoulders 74b and 74c are formed on either side of the tip portion 74a and have a width corresponding to the gage the end coil 24b. The tip portion 74a is fit into the end coil 24b so that the shoulders engage the end coil 24b at diametrically opposite points thereon. As a consequence the coil spring 24 is centered within the sleeve 28 to apply a uniform biasing force on the thermistor 22 which will cause it to be seated flat against the seat 20 for assuring an efficient electrical engagement therebetween.

Still another feature of the present invention is that the multi-purpose terminal 14 enables the electrical continuity between the sleeve 16 and thermistor 22 to be probe checked after the female connector cover 12 has been connected to the shell 16. The probing can be accomplished by contacting a continuity check probe with the tapered end 70a of rectangular segment 70 without bending or removal of terminal plating material from the male blade defined by rectangular segment 72 of terminal 14. Specifically, the surface 70a is located offset to one side and above the end of the male blade as best shown in FIG. 1 so that the test probe can be inserted into the receptacle without contacting the male blade. The rectangular segment 70 has sufficient strength to be probed and yet remain vertically oriented perpendicular to the rest of the terminal 14 for insertion and alignment with blind hole 80 on the mating connector for indexing the mating connector 38 into alignment with the terminal segment 72. The above-described configuration of rectangular segment 70 prevents slightly smaller mating connectors on a wiring harness from being inadvertently inserted into receptacle 56 so as to damage the male blade on terminal 14.

While our invention has been described in terms of a preferred embodiment, it will be appreciated that other additional forms will be readily apparent to those skilled in the art. Accordingly, the scope of our invention is to be considered limited only by the following claims.

The embodiments of the invention in which an exclusive property or privilege is claims are defined as follows:

1. A temperature sender assembly including an electrically conductive shell having a tubular extension with a support surface, a thermistor element supported on the support surface, an electrically conductive compression spring located within said tubular extension having one end thereon engaged with the thermistor for completing an electrical circuit there across for sending a signal of the temperature sensed by the thermistor and electrical insulator means within the tubular extension for electrically insulating the spring from the shell and a female connector cover connected to the shell and having a base of electrical insulation material defining a cavity for receiving a mating male connector and with an electrical terminal molded in-situ of the base the temperature sensor assembly further characterized by:

said electrical terminal configured as a flat element including a core embedded within the base of the female connector cover and a first integral segment extending from said core interiorly of the tubular extension;

connector means on said first integral segment for capturing one end of the electrically conductive compression spring and for maintaining it in compression between the female connector cover and the thermistor when the female connector cover is fastened to said electrically conductive shell;

said electrical terminal having a second integral segment thereon extending from said core in the opposite direction from said first segment and including a piloting end thereon for mating the second segment with a terminal clip on a mating connector insertable into the cavity of the female connector cover; and said terminal element having a third integral segment thereon at a point offset with respect to said second integral segment for indexing a mating connector within said female connector cover prior to connection of the mating connector to said second integral segment; said third integral segment extending a distance above the end of said second integral segment for defining a test probe surface for probing the female connector cover for electrical continuity between the spring, thermistor and electrically conductive shell.

2. The temperature sender assembly of claim 1, further characterized by said compression spring being coiled along its length and having end coils thereon; said connector means including a tip portion and spaced shoulder surfaces; said tip portion having a width less than inside diameter of the compression spring and extending into one of said end coils and said spaced shoulder surfaces having a width corresponding to the gage of the compression spring coils and located in engagement with said one of said end coils for holding the compression spring coaxially of said first integral segment and the thermistor.

3. The temperature sender assembly of claim 1, further characterized by said third integral segment being formed as a rectangular extension on one end of said flat element, said rectangular extension being located on a longitudinal axis offset with respect to the longitudinal axis of said second integral segment.

4. The temperature sender assembly of claim 1, characterized by said flat element having first, second and third integral rectangular portions respectively forming the first, second and third integral segments of said flat element.

5. The temperature sender assembly of claim 4, characterized by two of said first, second and third integral rectangular portions being located in the same plane.

6. The temperature sender assembly of claim 4, characterized by first and second ones of said first, second and third integral rectangular portions extending into the cavity of the female connector cover for engagement with the mating connector when seated therein.

7. The temperature sender assembly of claim 6, wherein said first and second integral rectangular portions are located perpendicular to one another.

8. The temperature sender assembly of claim 6, wherein said second integral rectangular portion has a base segment thereon twisted 90 degrees with respect to the core of said flat element.

* * * * *